United States Patent
Orr et al.

(10) Patent No.: US 7,088,759 B2
(45) Date of Patent: Aug. 8, 2006

(54) RESONATOR BOX TO LASER CAVITY INTERFACE FOR CHEMICAL LASER

(75) Inventors: Jean Welhouse Orr, Thousand Oaks, CA (US); Yan Sau Tam, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 10/396,804

(22) Filed: Mar. 24, 2003

(65) Prior Publication Data

US 2004/0187697 A1  Sep. 30, 2004

(51) Int. Cl.
*H01S 3/22* (2006.01)
*H01S 3/95* (2006.01)
*H01S 3/08* (2006.01)

(52) U.S. Cl. ............................ 372/58; 372/89; 372/90; 372/98

(58) Field of Classification Search ............ 372/89–90, 372/55–59, 98
See application file for complete search history.

(56) References Cited

U.S. PATENT DOCUMENTS

| 3,731,227 A | * | 5/1973 | Rosenberger et al. ....... 313/148 |
| 3,876,960 A | * | 4/1975 | De Koker et al. ............ 372/89 |
| 3,891,943 A | * | 6/1975 | Dowley et al. ............... 372/56 |
| 3,916,338 A | * | 10/1975 | Jensen et al. ................ 372/89 |
| 4,553,243 A | | 11/1985 | Rosenwals et al. |
| 5,870,422 A | | 2/1999 | Florentino et al. |
| 5,883,916 A | | 3/1999 | Lohn et al. |
| 5,974,072 A | | 10/1999 | Hartlove et al. |
| 6,154,478 A | | 11/2000 | Vetrovec |
| 6,172,758 B1 | | 1/2001 | Livingston |
| 6,399,916 B1 | * | 6/2002 | Gortler et al. ......... 219/121.84 |
| 6,434,174 B1 | | 8/2002 | Hager et al. |
| 6,470,037 B1 | | 10/2002 | Florentino et al. |
| 6,801,561 B1 | * | 10/2004 | Kleinschmidt ............... 372/57 |
| 2002/0021731 A1 | * | 2/2002 | Bragin et al. ................. 372/57 |
| 2002/0041617 A1 | * | 4/2002 | Itakura et al. ................ 372/59 |

FOREIGN PATENT DOCUMENTS

WO    WO 86/02207 A1 *  4/1986

* cited by examiner

*Primary Examiner*—James Menefee
(74) *Attorney, Agent, or Firm*—Ostrager Chong Flaherty & Broitman P.C.

(57) ABSTRACT

A laser system (52A) is illustrated having a laser cavity (54) that generates a laser beam (78). An outcoupling resonator box (62) has a reflective mirror (70) therein. A return resonator box (64) has a reflective mirror (72) therein. A first solid window assembly (66) is disposed between the outcoupling resonator box (62) and the laser cavity (54). A second solid window assembly (68) is disposed between the return resonator box (64) and the laser cavity (54) so that the beam (78) is directed through the solid window assemblies (66), (68) during operation of the laser system, thereby isolating the usually caustic environment of laser cavity (54) from that of mirrors (70), (72) that are housed in said resonator boxes (62), (64), without the use of isolation valves and optical tunnels as in traditional arrangements.

23 Claims, 3 Drawing Sheets

RESONATOR BOX TO LASER CAVITY INTERFACE FOR CHEMICAL LASER

STATEMENT REGARDING FEDERALLY SPONSORED RESEARCH

This invention was made with Government support under contract number USZA22-02-C-0044, awarded by the United States Special Operations Command. The Government has certain rights in this invention.

TECHNICAL FIELD

The present invention relates to high-energy chemical lasers and more particularly to an interface between the laser cavity and the resonator boxes for Chemical Oxygen-Iodine Laser (COIL).

BACKGROUND ART

High-power chemical lasers such as Chemical Oxygen-Iodine Lasers have been proposed for various military applications and other industrial applications. In chemical lasers, chemical reactions are used to produce exited atoms or molecules in a flow of suitable mixture of rarefied gases. Gas containing excited species is flowed through a laser cavity or resonator where optical energy is extracted from the excited species by means of an optical resonator. Required flow throughput and pressure are produced by vacuum pumps which draw the gas mixture through the laser cavity. High-energy chemical lasers for military applications often produce hundreds of kilowatts of optical power. The corresponding gas throughput in the range of 10–100 Torr pressure requires vacuum pumps with pumping speeds on the order of several hundred thousand liters per second. Military applications for high-power chemical lasers include tactical air defense which necessitates deployment of laser weapons in forward positions on the battlefield. Such laser weapons must be transportable and, therefore, of limited size and weight. In addition, the laser weapon should be concealable and undetectable by the enemy.

High-energy chemical lasers can be classified as either 1) hydrogen-halide or 2) Chemical Oxygen-Iodine Laser (COIL). Hydrogen-halide lasers typically involve a reaction of hydrogen and/or deuterium with fluorine, chlorine, bromine or iodine in diluent gases of nitrogen, helium, or alike, to produce hydrogen and/or deuterium halide molecules in excited vibrational states from which laser energy can be extracted. Exhaust from the laser cavity of a hydrogen-halide laser is typically a mixture of gases at high temperature (up to 1000 degrees Centigrade) including HF (and/or DF), $N_2$, and possibly small amounts of $H_2$ (and/or $D_2$), $O_2$ and $H_2O$.

On the other hand, COIL lasers typically involve reaction of chlorine in diluent gases such as nitrogen or helium, with aqueous solution of alkaline hydrogen peroxide to produce intermediate excited specie known as singlet delta oxygen. Singlet delta oxygen is subsequently mixed with iodine vapor to generate iodine atoms in electrically excited state and suitable for extraction of laser energy. Exhaust from a COIL laser cavity is typically a mixture of gases at near ambient temperature including nitrogen or helium and oxygen with small amounts of chlorine, iodine, and water.

The laser cavity or gain region is typically separated from the resonator boxes using an isolation valve and a flow straightening optical tunnel on either end of the cavity region. The overall length, the two valves, and two tunnels increase the mass of the system. Such systems may be employed in transportable-type systems, such as but not limited to airplanes, ground-vehicle mounted, or sea-based. Reducing the mass of transportable-type systems is a desirable goal. It should be also noted that these systems are mounted to a bench or fixture. The length of the bench must be the sum of the length of the laser cavity plus the resonator boxes lengths plus the lengths of the optical tunnels and the isolation valves. Such systems also include a vacuum pump and purge gases that are used to create a positive pressure in the resonator boxes so that flow direction of the gases is out of the box through the cavity and diffuser and the gases do not back flow into the resonator boxes. It should be noted that back flow of the laser cavity exhaust may cause caustic damage to the precision optics inside the resonator boxes. It also should be noted that the optical isolation valves completely block the line of sight of the lasers when not open. The closed valve prevents the monitoring of the optics within the boxes thereby limiting the ability to make the as-required adjustments to the optics for alignment of the laser optical resonator. Each valve has an associated actuator system that also increases the mass of the laser system.

It would therefore be desirable to reduce the mass of a laser system to be suitable for use in a mobile-based or transportable-type system.

It would therefore also be desirable to have a low mass means of preventing laser cavity exhaust back flow into the optical enclosures.

It would therefore be desirable to provide a low mass means of unobstructed inter-optical enclosure line-of-sight that facilitates optical resonator alignment.

SUMMARY OF THE INVENTION

The present invention provides a reduced-weight laser system suitable for mobile applications by reducing the number of and sizes of components associated therewith.

In one aspect of the invention, a laser system has a laser cavity, an outcoupling resonator box having a partially reflective mirror therein, and a return resonator box having a reflective mirror therein. A first solid window assembly is disposed between the outcoupling resonator box and the laser cavity. A second solid window assembly is disposed between the return resonator box and the laser cavity. During operation when the laser cavity generates a beam, the beam is directed through the first solid window and the second solid window.

In a further aspect of the invention, a Chemical Oxygen-Iodine Laser (COIL) system includes a laser cavity, a singlet delta oxygen generator coupled to the laser cavity, an iodine source coupled to the cavity, an outcoupling resonator box having a partially reflective mirror therein, a return resonator box having a reflective mirror therein, a first solid window assembly disposed between the outcoupling resonator box and the laser cavity, a second solid window assembly disposed between the return resonator box and the laser cavity. The beam generated by the laser cavity is directed through the first solid window and the second solid window during operation.

One advantage of the invention is that the overall length of the system is reduced by making the optical tunnels and the isolation valves usually associated with such devices unnecessary and thereby removing them. In addition, the actuation system for the isolation valves has also been removed. Thus, the removal of the optical isolation valves, the optical tunnels, and to a lesser degree the valve actuation system, reduces weight. Also, the optical bench to which the optical tables are mounted may also be reduced in length, which in turn further reduces the overall mass of the system.

Another advantage of the invention is that because the optical isolation valves have been removed, the line of sight through the resonator allows anytime alignment and checking of the resonator. Anytime alignment has two-fold advantage in that the alignment may be checked at a convenient time not only immediately prior to laser firing, and thereby the battle readiness time of the laser system is improved.

Other aspects and advantages of the present invention will become apparent upon the following detailed description and appended claims, and upon reference to the accompanying drawings.

BEST MODES FOR CARRYING OUT THE INVENTION

Figure 1:
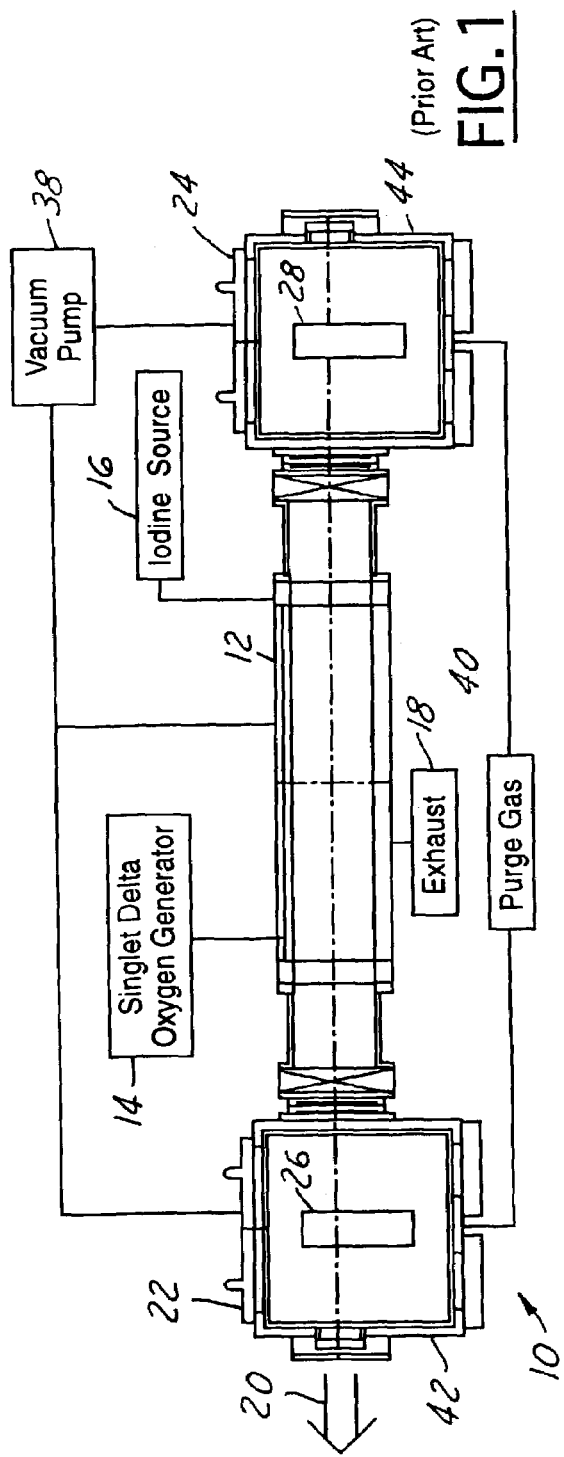
FIG. 1 is a top cross-sectional view of a traditional resonator arrangement according to the prior art.

In the following figures the same reference numerals will be used to identify the same components.

The present invention is illustrated with respect to an airborne-based system. However, those skilled in the art will recognize that the present invention is particularly suitable for various types of transportable-type of laser applications, including sea-based, vehicle-based, airborne-based, person-based, or space-based. The present invention is also suitable for various other types of applications not military including industrial applications.

Figure 2:
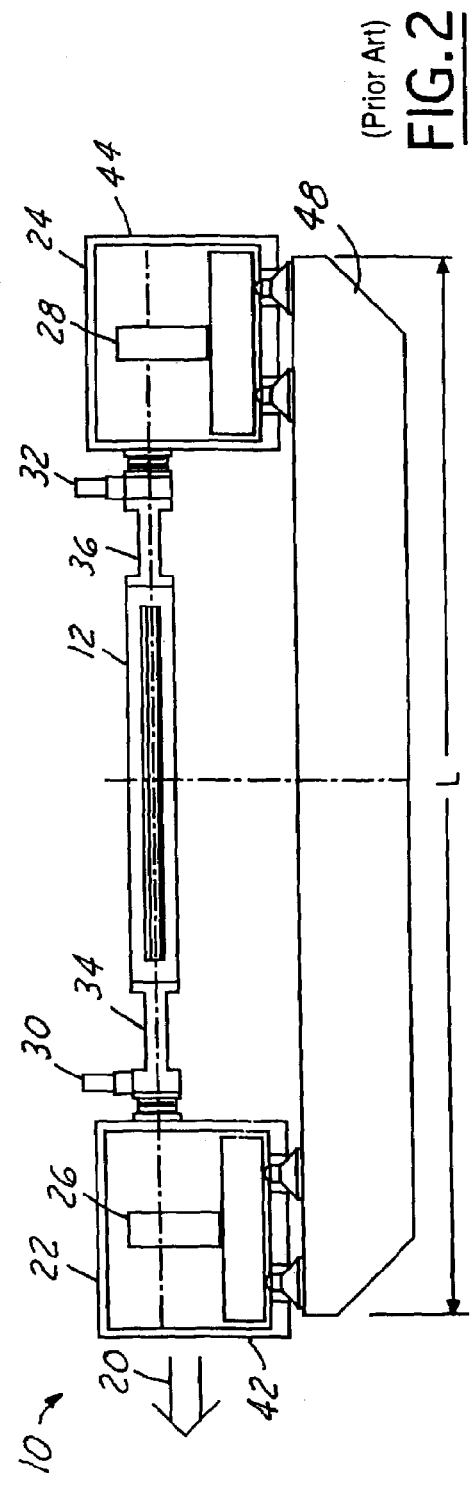
FIG. 2 is a side cross-sectional view of a traditional resonator arrangement according to the prior art.

Referring now to FIGS. 1 and 2, a laser system 10 according to the prior art is illustrated. Laser system 10 generally includes a laser cavity 12, which is sometimes called a gain region. Laser cavity 12 is coupled to a singlet delta oxygen generator 14 and an iodine source 16. An exhaust system 18 is also coupled to laser cavity 12 to remove exhaust gases therefrom. One type of exhaust gas system is described in U.S. Pat. No. 6,154,478, to the same assignee as the present invention. The disclosure of U.S. Pat. No. 6,154,478 is hereby incorporated by reference. The chemical reactions carried out in generator 14 are generally known and will not be dealt with to any great extent in this description other than to state that $H_2O_2$ is reacted with chlorine to produce the singlet delta oxygen which is represented by the symbol $O_2^*$. The produced $O_2^*$ is then fed into laser cavity 12 where it reacts with iodine from iodine source 16 to generate the laser beam 20.

The laser cavity 12 generates laser beam 20 which is directed to an outcoupling resonator box 22 and a return resonator box 24. Outcoupling resonator box 22 has a partially reflective mirror 26, while return resonator box 24 has a fully reflective mirror 28. Thus, the lasing occurs between mirrors 26 and 28. Prior systems typically include two isolation valves 30, 32 that are mechanically actuated to open and close the path to resonator boxes 22, 24. In addition, two optical tunnels 34, 36 are also positioned in the laser's path to straighten out the purge gas 40 flow therethrough. The isolation valves 30, 32 have actuating means associated therewith that are not illustrated in the present invention. This actuating means also adds to the mass of the invention.

The resonator boxes 22 and 24 are coupled to a vacuum pump 38. Also, purge gas source 40 is coupled to the resonator boxes 22 and 24. The combination of the purge gas source 40 and the vacuum pump 38 allows the proper flow of gases therethrough from the resonator boxes 22 and 24 to the laser cavity 12. The purge gas source 40 is used to maintain a higher pressure at resonator boxes 22, 24 so that caustic gases originated from laser cavity 12 do not enter the resonator box. Because the resonator boxes are under vacuum, the exterior walls 42 and 44 must be reinforced to withstand the differential pressure. The reinforced walls increase the mass of the system.

As is best shown in FIG. 2, the laser system 10 is mounted to a bench 48. Bench 48 is as long as the distance of the laser cavity 12, the isolation valves 30, 32, the optical tunnels 34, 36, and the resonator boxes 22, 24. As is described above, the vacuum pump, the isolation valves and the actuation mechanisms associated therewith, the optical tunnels 34 and 36, the purge gas source 40, and vacuum pump 38 increase the weight of the system considerably. Therefore, as described below, these systems have been removed in the present invention.

Figure 3:
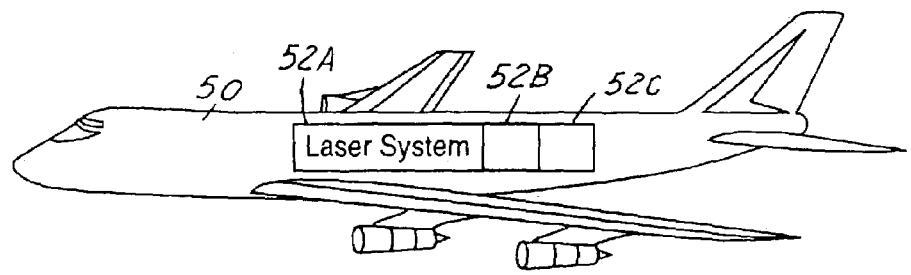
FIG. 3 is a plan view of an aircraft having a laser system according to the present invention.

Referring now to FIG. 3, a mobile platform 50 such as, but not limited to, an aircraft, semi-truck, or other automotive vehicle, or satellite is illustrated having laser systems 52A, 52B, and 52C. Laser systems 52A-52C individually may not develop enough power to perform its specific mission. Therefore, lasers 52A-52C may be coupled in series so that the power produced thereby is additive.

Figure 4:
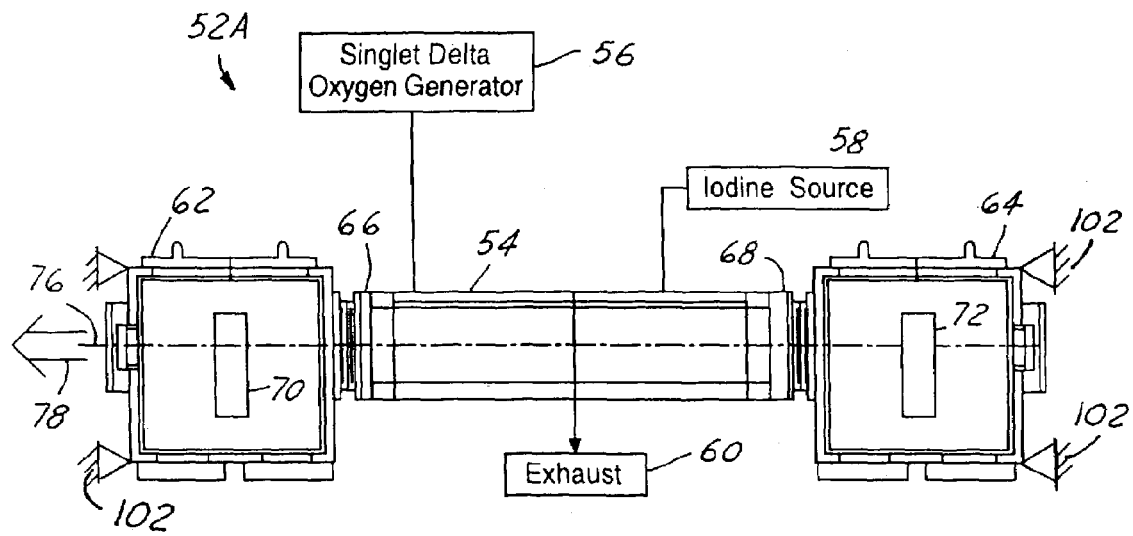
FIG. 4 is a top cross-sectional view of a resonator arrangement for a laser according to the present invention.
Figure 5:
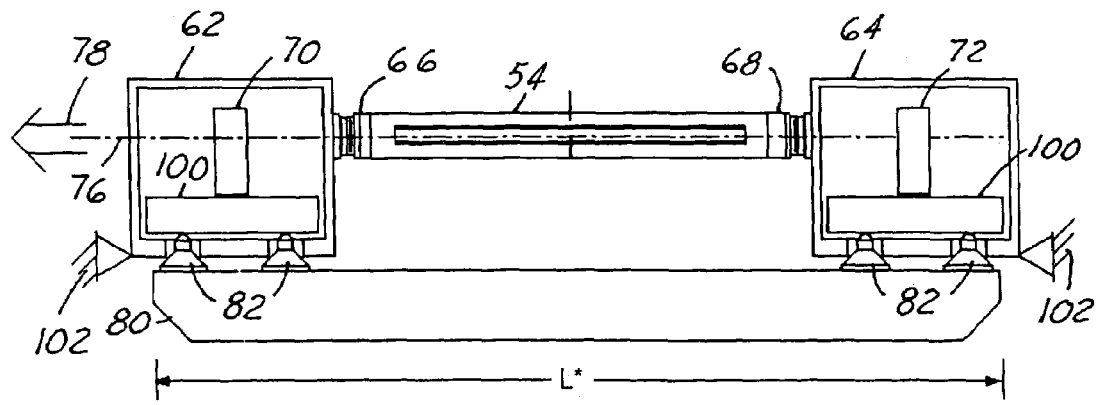
FIG. 5 is a side cross-sectional view of FIG. 4.

Referring now to FIGS. 4 and 5, a laser system 52A from FIG. 3 is illustrated in further detail. Laser system 52A includes a laser cavity 54 coupled to a singlet delta oxygen generator 56 and an iodine source 58. The laser cavity is coupled to exhaust 60. The singlet delta oxygen generator 56, the iodine source 58, and the exhaust system 60 operate in a similar manner to the laser system 10 described above and therefore will not be described in further detail. The laser cavity 54 is coupled to outcoupling resonator box 62 and return resonator box 64 through a respective solid window 66, 68. Outcoupling resonator box 62 has a partially reflective mirror 70 therein. Return resonator box 64 has a fully reflective mirror 72 disposed therein. The laser cavity 54, partially reflective mirror 70, fully reflective mirror 72, outcoupling resonator box 62, and return resonator box 64 share an optical axis 76 along which a laser beam 78 is ultimately generated.

Solid window assemblies 66, 68 have a solid window preferably formed of a chemical resistant and high temperature tolerant material such as but not limited to Sapphire. The solid window assemblies 66, 68 are fixed into place between laser cavity 54 and respective resonator boxes 62, 64. The laser cavity 54 is sealed against window assemblies 66, 68. This allows resonator boxes 62, 64 to be non-pressurized or maintained at atmospheric pressure. As is best shown in FIG. 5, mirrors 70, 72 are mounted to a bench 80 through tables 100 and mounts 82. In addition, resonator boxes 62, 64 are mounted to base structure 102 of a mobile platform 50. As is mentioned above, the optical tunnels and isolation valves of the prior art have been removed and thus the total length L* of bench 80 is shorter than the length L of the bench illustrated in FIG. 2. This reduces the mass of the system.

Figure 6:
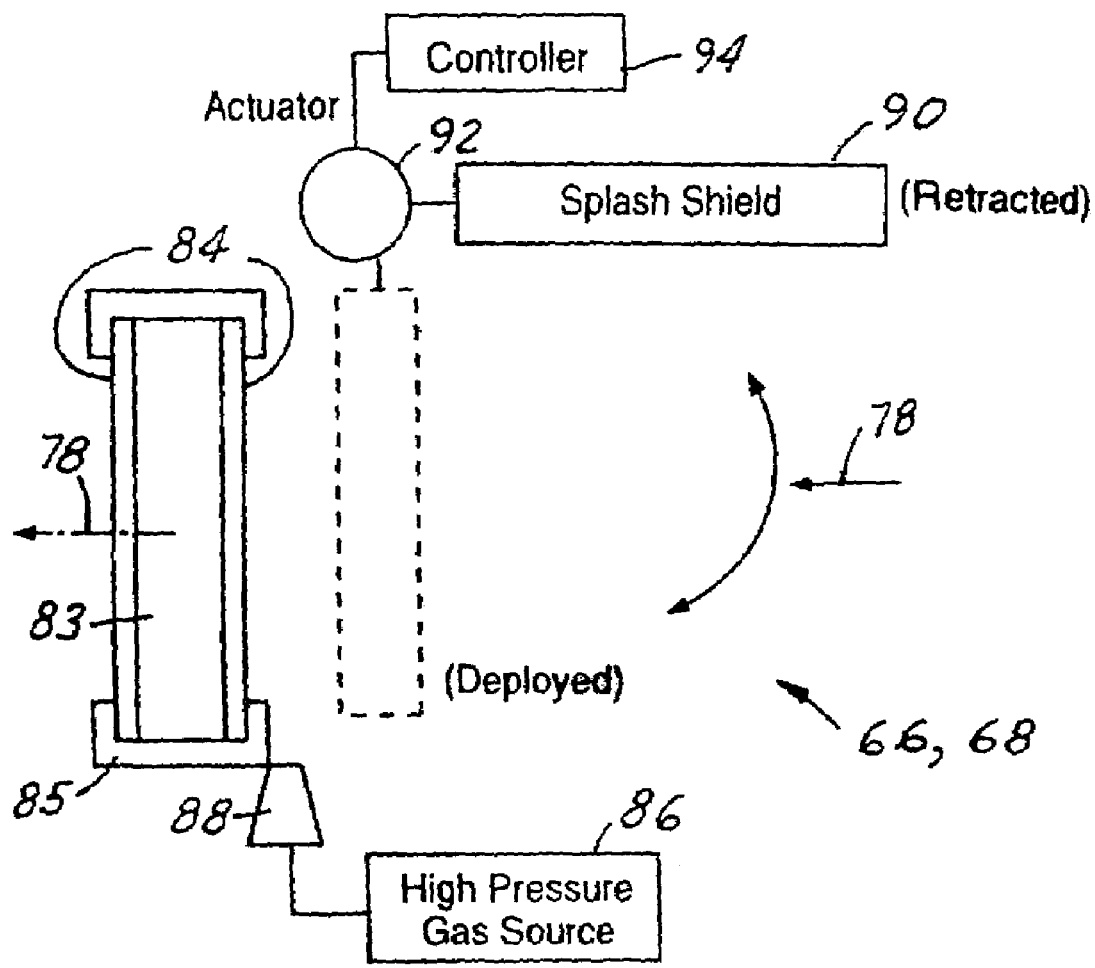
FIG. 6 is a simplified block diagram of a splash shield and nozzle washing system for the solid window assembly.

Referring now to FIG. 6, solid window assemblies 66, 68 include a solid window 83 that, as described above, is made from a heat resistant and chemical resistant material such as, but not limited to, Sapphire. For reference, the direction of laser beam 78 is illustrated. The solid window 83 may include anti-reflective coating 84 disposed thereon. The solid window 83 may also be secured to a housing 85.

A high-pressure gas source 86 may direct high-pressure gas through a nozzle 88 to "wash" the surface of solid window 83 to prevent the impingement of contaminants coming from laser cavity 54. The type of high-pressure gas may vary depending on the type of laser. Ideally, the high-pressure gas source 86 will provide high-pressure inert gas that will not react with the chemicals used in the chemical laser.

In addition to the high-pressure gas source 86 and nozzle 88, a splash shield 90 may also be disposed adjacent to solid window 83. Splash shield 90 is coupled to an actuator 92 and a controller 94. The splash shield 90 is actuated out of the way when lasing of the laser cavity is desired. Splash shield 90 helps prevent the caustic material within a chemical laser from contacting the solid window 83 during the period just prior to lasing. In chemical lasers in which the materials within the chemical laser are not that caustic, splash shield 90 may be eliminated. Actuator 92 may be a motor or solenoid-operated device that upon command of a controller, which may be part of a central laser system controller, moves the splash shield in or out of the optical path.

It should be noted that the solid window configuration shown in FIG. 6 shall be used for both solid window assemblies 66 and 68 with the nozzle 88 and splash shield 90 disposed on the laser cavity side of the window 83. The light beams are reflected down the optical axis 76 by mirrors 72 and 70. Because the mirror 70 is partially reflected, a portion of the light is directed out of outcoupling resonator box 62 to form laser beam 78.

In operation, when immediate lasing of the laser cavity 54 is desired, the splash shield 90 is commanded to move out of position and out of the optical path. The high-pressure gas source 86 may continue to "wash" the surface interior to the laser cavity of the solid window 83. The alignment of the optical resonator may be checked at any time by moving or displacing the splash shield 90 so that the system may be ready more quickly than that of conventional systems.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A laser system comprising:
  a laser cavity generating a beam;
  an outcoupling resonator box having a partially reflective mirror therein;
  a return resonator box having a reflective mirror therein;
  a first solid window assembly comprising a first solid window disposed between the outcoupling resonator box and the laser cavity and a first splash shield directly adjacent to the first solid window and the laser cavity; and
  a second solid window assembly comprising a second solid window disposed between the return resonator box and the laser cavity and a second splash shield directly adjacent to the second solid window and the laser cavity,
  wherein said beam is directed through said first solid window and said second solid window during operation.

2. A laser system as recited in claim 1 wherein the first and second window assemblies each comprise one housing.

3. A laser system as recited in claim 2 wherein the first and second window assemblies comprise a solid window coupled to the housing.

4. A laser system as recited in claim 1 wherein the first and second window assemblies comprise one each nozzle coupled to a high-pressure gas source, said nozzle directed at said window.

5. A laser system as recited in claim 1 wherein said splash shield is moveably disposed with respect to said window assembly.

6. A laser system as recited in claim 5 wherein said window assemblies each comprise one actuator movably coupling said splash shield to said window assemblies.

7. A laser system as recited in claim 1 thither comprising a singlet delta oxygen generator coupled to the laser cavity.

8. A laser system as recited in claim I Thither comprising an iodine source coupled to the laser cavity.

9. A laser system as recited in claim 1 further comprising an exhaust system coupled to the laser cavity by receiving exhaust gas from the laser cavity.

10. A transportable c-type system comprising the laser system of claim 1.

11. A chemical oxygen-iodine laser system comprising:
  a laser cavity;
  a singlet delta oxygen generator coupled to the laser cavity;
  an iodine source coupled to the cavity;
  an outconpling resonator box having a partially reflective mirror therein;
  a return resonator box having a reflective mirror therein;
  a first solid window assembly disposed between the outcoupling resonator box and the laser cavity, said first solid window assembly comprising a first solid window disposed between the outcoupling resonator box and the laser cavity and a first splash shield directly adjacent to the first solid window and the laser cavity;
  a second solid window assembly disposed between the return resonator box and the laser cavity, said second solid window assembly comprising a second solid window disposed between the return resonator box and the laser cavity and a second splash shield directly adjacent to the second solid window and the laser cavity,
  wherein said beam is directed through said first solid window and said second solid window during operation.

12. A laser system as recited in claim 11 wherein the first and second solid window assemblies each comprise one housing.

13. A laser system as recited in claim 12 wherein the first and second window assemblies each comprise a solid window coupled to the housing.

14. A laser system as recited in claim 13 wherein the first and second window assemblies each comprise a nozzle coupled to a Ugh-pressure gas source, said nozzle directed at said solid window.

15. A laser system as recited in claim 11 wherein said splash shield is moveably disposed with respect to said first and second window assemblies.

16. A laser system as recited in claim 15 wherein said window assemblies comprise one each actuator movably coupling said shield to said first window assembly.

17. A transportable-type system comprising the laser system of claim 11.

18. A transportable type laser system comprising:
a plurality of laser systems coupled in series, each of said laser systems comprising,
a laser cavity;
an outcoupling resonator box having a partially reflective mirror therein;
a return resonator box having a reflective mirror therein;
a first solid window assembly disposed between the outcoupling resonator box and the laser cavity, said first solid window assembly comprising a first solid window disposed between the outcoupling resonator box and the laser cavity and a first splash shield directly adjacent to the first solid window and the laser cavity; and
a second solid window assembly disposed between the return resonator box and the laser cavity, said second solid window assembly comprising a second solid window disposed between the return resonator box and the laser cavity and a second splash shield directly adjacent to the second solid window and the laser cavity.

19. A method of operating a laser having a laser cavity and first and second window assemblies, each including a solid window and a splash shield wherein the first splash shield is directly adjacent to the first solid window assembly and the laser cavity, and the second splash shield is directly adjacent to the second solid window assembly and the laser cavity, comprising:

opening the first splash shield that covers the first solid window assembly, said first splash shield being directly adjacent to the laser cavity;

onening the second splash shield that covers the second solid window assembly, said second splash shield being directly adiacent to the laser cavity;

thereafter, generating a laser beam in the laser cavity;

directing the laser beam between a first resonator box having the first solid window assembly and a second resonator box having the second solid window assembly:

whereby the laser beam is directed through said first solid window and said second solid window during operations.

20. A method as recited in claim 19 further comprising checking alignment of an optical resonator after opening the splash shield.

21. A method as recited in claim 19 further comprising directing a bigh pressure gas nozzle at the first solid window assembly.

22. A method as recited in claim 19 further comprising directing a high prcssure gas nozzle at the second solid window assembly.

23. A method as recited in claim 19 further comprising maintaining the first resonator box at atmospheric pressure.

* * * * *